United States Patent
Orihashi (10) Patent No.: US 8,431,277 B2
(45) Date of Patent: Apr. 30, 2013

(54) FUEL CELL SYSTEM AND GENERATION CONTROL DEVICE

(75) Inventor: Nobuyuki Orihashi, Toyota (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 1243 days.

(21) Appl. No.: 11/989,582

(22) PCT Filed: Jul. 14, 2006

(86) PCT No.: PCT/JP2006/314434
§ 371 (c)(1),
(2), (4) Date: Jan. 28, 2008

(87) PCT Pub. No.: WO2007/020768
PCT Pub. Date: Feb. 22, 2007

(65) Prior Publication Data
US 2009/0155651 A1    Jun. 18, 2009

(30) Foreign Application Priority Data

Aug. 15, 2005 (JP) ................... 2005-235509

(51) Int. Cl.
*H01M 8/06* (2006.01)
(52) U.S. Cl.
USPC ........... 429/414; 429/408; 429/413; 429/428; 429/450
(58) Field of Classification Search .............. 429/413, 429/414
See application file for complete search history.

(56) References Cited

U.S. PATENT DOCUMENTS 6,940,255 B2 *  9/2005  Loch ............................ 320/132

FOREIGN PATENT DOCUMENTS

| JP | 2001-256988 A | 9/2001 |
|---|---|---|
| JP | 2002-164065 A | 6/2002 |
| JP | 2003-68337 A | 3/2003 |
| JP | 2004-119052 A | 4/2004 |
| JP | 2004-158274 A | 6/2004 |
| JP | 2004-192973 A | 7/2004 |
| JP | 2004192973 A * | 7/2004 |
| JP | 2006-216255 A | 8/2006 |
| WO | WO 2005018980 A2 * | 3/2005 |

OTHER PUBLICATIONS

JP 2004 192973 A (English machine translation).*

* cited by examiner

*Primary Examiner* — Ula C Ruddock
*Assistant Examiner* — Scott J Chmielecki
(74) *Attorney, Agent, or Firm* — Kenyon & Kenyon LLP (57) ABSTRACT

A fuel cell system capable of accurately and precisely determining the wet condition inside a fuel cell. The fuel cell system includes a solid polymer electrolyte type fuel cell having a stack structure. The fuel cell is connected to an air supply system, a hydrogen gas supply system, an output system, and a control unit. The control unit receives flow rates of air and hydrogen gas which flow into the fuel cell, their pressures when exhausted, and a generated current measurement signal. The control unit calculates the amounts of water exhausted from the fuel cell as a gas component and as a liquid component and determines the water balance in the fuel cell.

15 Claims, 3 Drawing Sheets

FUEL CELL SYSTEM AND GENERATION CONTROL DEVICE

This is a 371 national phase application of PCT/JP2006/314434 filed Jul. 14, 2006, which claims priority of Japanese Patent Application No. 2005-235509 filed Aug. 15, 2005, the contents of which are incorporated herein by reference.

TECHNICAL FIELD

The present invention relates to a fuel cell system and a generation control device.

BACKGROUND ART

In a fuel cell system, the fuel gas represented by hydrogen gas and the oxidant gas represented by air are supplied to a fuel cell, and electric power is generated by the generation reaction (water generation reaction) of the fuel gas and the oxidant gas. As the fuel cell, various types of fuel cells have been developed. Among them, a polymer electrolyte fuel cell (PEFC) that has no problems with dissipation or retention of an electrolyte, having advantages that it starts up at room temperature and that warm-up time is extremely short, attracts a special attention. In order to obtain high voltage, stacked PEFCs are adopted in movable bodies such as automobiles.

In this polymer electrolyte fuel cell, a polymer electrolyte layer conducts protons in the reaction between fuel gas and oxidant gas. Therefore, in order to efficiently maintain a generation reaction, it is necessary to monitor the wet condition or temperature condition of the polymer electrolyte layer, and to control it in an appropriate state.

In order to perform such control, for example, Patent Document 1 suggests a fuel cell system and method for measuring the temperature, humidity, and flow rate of the inflow gas to a fuel cell and the exhaust gas from the fuel cell to calculate the water balance with respect to the fuel cell, performing comparison with the generated water amount calculated from the electric power of the fuel cell to control the flow rate of the inflow gas, and controlling the amount of water remaining inside the fuel cell to within a proper level in the polymer electrolyte layer.

[Patent Document 1] Japanese Patent Application Laid-Open No. 2004-192973

DISCLOSURE OF THE INVENTION

Meanwhile, during the operation of the fuel cell system, the fuel cell contains not only the water that exists as steam, i.e., a gas component, but the water that becomes, for example, fine water droplets and exists as a liquid component especially when the state of supersaturation has occurred. Therefore, in order to surely grasp the water balance of the fuel cell to grasp residual water accurately, it is necessary to take into consideration the amount of water carried out to the outside of the fuel cell system as a liquid component as such.

However, in the above conventional fuel cell system, the water that exists and is exhausted as such a liquid component is not considered in calculation of the water balance, and therefore it is difficult to accurately grasp the water amount and wet condition inside the fuel cell.

Thus, the invention has been made in view of such circumstance. It is therefore an object of the invention to provide a fuel cell system capable of more accurately grasp the amount of water inside a fuel cell, and more accurately and precisely determining the wet condition inside the fuel cell. It is also another object of the invention to provide an operation control device capable of simply performing an efficient operation control of a fuel cell by using a data table in which generation amount obtained as the operation results of the fuel cell system of the invention is associated with the optimal supply amounts of fuel gas and oxidant gas.

In order to achieve the above objects, according to one aspect of the invention, there is provided a fuel cell system including a wet condition determination unit that determines water balance in a fuel cell and determines the wet condition of the fuel cell, from an inflow water amount and an exhausted water amount to and from the fuel cell and a generated water amount therein, wherein the wet condition determination unit calculates the inflow water amount, the amount of water exhausted as a gas component from the fuel cell and the amount of water exhausted as a liquid component from the fuel cell, both of which are each provided as the exhausted water amount, and the generated water amount, on the basis of the physical amount of inflow gas to the fuel cell, the physical amount of exhaust gas from the fuel cell, and the state quantity of the fuel cell.

In the fuel cell system having the above configuration, the wet condition determination unit calculates the inflow water amount to the fuel cell, the exhausted water amount from the fuel cell, and the amount of generated water, and then determines the water balance in the fuel cell on the basis of them. As a result, the amount of water remaining inside the fuel cell is grasped, and the wet condition inside the fuel cell is determined. In this case, since not only the amount of water exhausted as a gas component but also the amount of water exhausted as a liquid component is additionally considered as the exhausted water amount, the water balance inside the fuel cell is grasped accurately.

Specifically, the wet condition determination unit preferably calculates the inflow water amount by using a flow rate, pressure, and humidity or dew-point temperature as the physical amount of the inflow gas, calculates the amount of water exhausted as a gas component by using a flow rate, pressure, and humidity or a dew-point temperature or temperature as the physical amount of the exhaust gas, and calculates the generated water amount from a generated current as the state quantity of the fuel cell.

In this case, the volume of inflow gas per unit time is calculated from the flow rate and pressure of the inflow gas, and the amount of water carried into the fuel cell as a gas component, i.e., the inflow water amount is obtained from the volume of inflow gas and humidity (may be relative humidity or absolute humidity) or a dew-point temperature, i.e., a content rate of water as a gas component of the inflow gas. Further, the amount of water exhausted as a gas component from the fuel cell is similarly obtained from the flow rate, pressure, and humidity or dew-point temperature of the exhaust gas. Moreover, since the generated current corresponds to the amount of reaction of the inflow gases (fuel gas and oxidant gas) in the fuel cell, the amount of water generated by the reaction per unit time is obtained from the generated current.

Here, if the water balance inside the fuel cell is positive (plus), i.e., the total of the inflow water amount to the fuel cell and the generated water amount (increased amount of water) is more than the exhausted water amount (reduced amount of water), generally, the fuel cell is supersaturated. As a result, some water may become fine droplets in the form of, for example, mist, and thereby, may exist as a liquid component. Therefore, it is also possible to determine the existence or nonexistence of the water that may be exhausted as a liquid component, on the basis of whether the balance is positive or negative (plus or minus) in the inflow water amount, the amount of water exhausted as a gas component, and the generated water amount, which are calculated as described above.

Further, when the fuel cell is operated, generally, the gas inside the fuel cell and the exhaust gas are supersaturated. Thus, instead of the humidity or dew-point temperature of the exhaust gas, the amount of water exhausted as a gas component from the fuel cell may be calculated using a saturated vapor amount uniquely determined from the temperature. This makes it unnecessary to actually measure humidity and dew-point temperature.

Moreover, preferably, the wet condition determination unit calculates the consumed flow rate of the inflow gas consumed inside the fuel cell from the generated current and calculates the flow rate of the exhaust gas from the consumed flow rate and the flow rate of the inflow gas.

As described above, since the generated current corresponds to the amount of reaction, i.e., consumption amount of the inflow gases (fuel gas and oxidant gas) in the fuel cell, the consumed flow rate of the inflow gas is calculated simply. Therefore, this makes it unnecessary to actually measure the flow rate of the exhaust gas.

Furthermore, preferably, the wet condition determination unit calculates the amount of water exhausted as a liquid component when the fuel cell is actually operated, on the basis of "the relationship of the amount of water exhausted as a liquid component from the fuel cell with respect to the flow rate of the exhaust gas" obtained in advance prior to actual operation of the fuel cell, and the flow rate of the exhaust gas when the fuel cell is actually operated. In addition, the amount of water exhausted as a liquid component from the fuel cell may be calculated by at least any one of the generation amount of the fuel cell, the temperature of the exhaust gas, and the flow rate of the exhaust gas.

Further, since the water that exists as a liquid component such as fine droplets inside the fuel cell may be exhausted to the outside of the fuel cell along with the flow of the exhaust gas, it is also possible to catch only the droplets in the exhaust gas, or sample the exhaust gas to measure or evaluate the amount of water exhausted as a liquid component.

If the exhaust gas from the fuel cell is in an supersaturated state, the ratio of the water as a gas component and the water as a liquid component that may exist in the exhaust gas is determined by the saturated water vapor pressure determined from the temperature thereof, but the amount of water as a liquid component exhausted to the outside of the fuel cell by the exhaust gas is largely influenced by the flow rate of the exhaust gas. Further, the flow rate of the exhaust gas tends to correlate with the generation amount (output power, generated current) of the fuel cell in the operational state of the fuel cell.

Therefore, parameters such as the generation load of the fuel cell and/or the flow rate of the exhaust gas can correlate with the amount of water exhausted as a liquid component from the fuel cell. Accordingly, the amount of water exhausted as a liquid component is calculated simply and precisely by acquiring the correlation in advance with respect to the fuel cell to be targeted, and comparing the correlation with the actual measurement values of the parameters.

Further, it is particularly preferable that the wet condition determination unit calculates the amount of water exhausted as a liquid component when the temperature of the fuel cell or exhaust gas is below a predetermined temperature.

Since the saturated water vapor pressure also drops as the temperature of the exhaust gas gets lower, the amount of water as a liquid component that may exist in the exhaust gas increases, and thereby the amount of water that is exhausted as a liquid component from the fuel cell also increases. Therefore, particularly when the fuel cell is in a low-temperature condition, and the temperature of the exhaust gas is below a predetermined temperature, the amount of water remaining inside the fuel cell during such low-temperature operation is more accurately grasped by calculating the amount of water exhausted as a liquid component to determine the water balance.

More specifically, it is useful that the inflow gas and exhaust gas are fuel gas and/or oxidant gas.

Generally, with the fuel cell, water is generated on the side of an oxygen electrode (cathode) to which oxidant gas is supplied when power is generated. This water may be liquefied by condensation, and may stagnate in a gas flow passage by bedewing, etc. As a result, if the water cannot be exhausted out of the system, a so-called flooding state where the flow passage of the oxidant gas is blocked is apt to occur. This will obstruct power generation and lower the output of the fuel cell. Further, since the generated water can exude even toward a fuel electrode (anode) through an electrolyte membrane, the flow passage of the fuel gas may be blocked, and thereby, the flooding may occur similarly. Therefore, it is preferable to calculate the amount of water exhausted as a liquid component with respect to both fuel gas and oxidant gas from the viewpoint of contribution to the control for preventing this flooding, and it is preferable to perform such calculation with respect to oxidant gas when such calculation is performed with respect to either the fuel gas or oxidant gas.

According to such a fuel cell system of the invention, since the water balance in the fuel cell is determined by considering not only the amount of water exhausted as a gas component from the fuel cell but the amount of water exhausted as a liquid component, the water amount inside the fuel cell can be grasped more accurately, and thereby the wet condition inside the fuel cell can be determined more accurately and precisely.

Further, a generation control device according to the invention includes a memory unit that stores a data table in which a generation amount in the fuel cell, which is set on the basis of the determination result of the water balance of the fuel cell and the determination result of the wet condition of the fuel cell in the fuel cell system according to the invention, is associated with supply flow rates of the fuel gas and the oxidant gas necessary to obtain the generation amount; and a control unit that performs operation control of supplying the fuel gas and the oxidant gas to the fuel cell or fuel cells other than the fuel cell so that a desired generation amount may be obtained in the fuel cell or other fuel cells on the basis of the data table.

BEST MODE FOR CARRYING OUT THE INVENTION

Hereinafter, embodiments of the invention will be described in detail. In addition, the same reference numerals will be given to the same elements, and the duplicate description will be omitted. Further, the positional relationship, such as up, down, right, and left, shall be based on the positional relationship shown in the drawings, unless otherwise defined. Moreover, the dimensional ratio of the drawings will not be limited to the ratio of illustration.

As described above, FIG. 1 is a block diagram schematically showing one embodiment of a fuel cell system according to the invention. A fuel cell system 1 includes a solid polymer electrolyte type fuel cell 2 that has a stack structure in which a number of cells are stacked. The fuel cell 2 is supplied with air as oxidant gas and hydrogen gas ($H_2$) as fuel gas to generate electric power.

Figure 1:
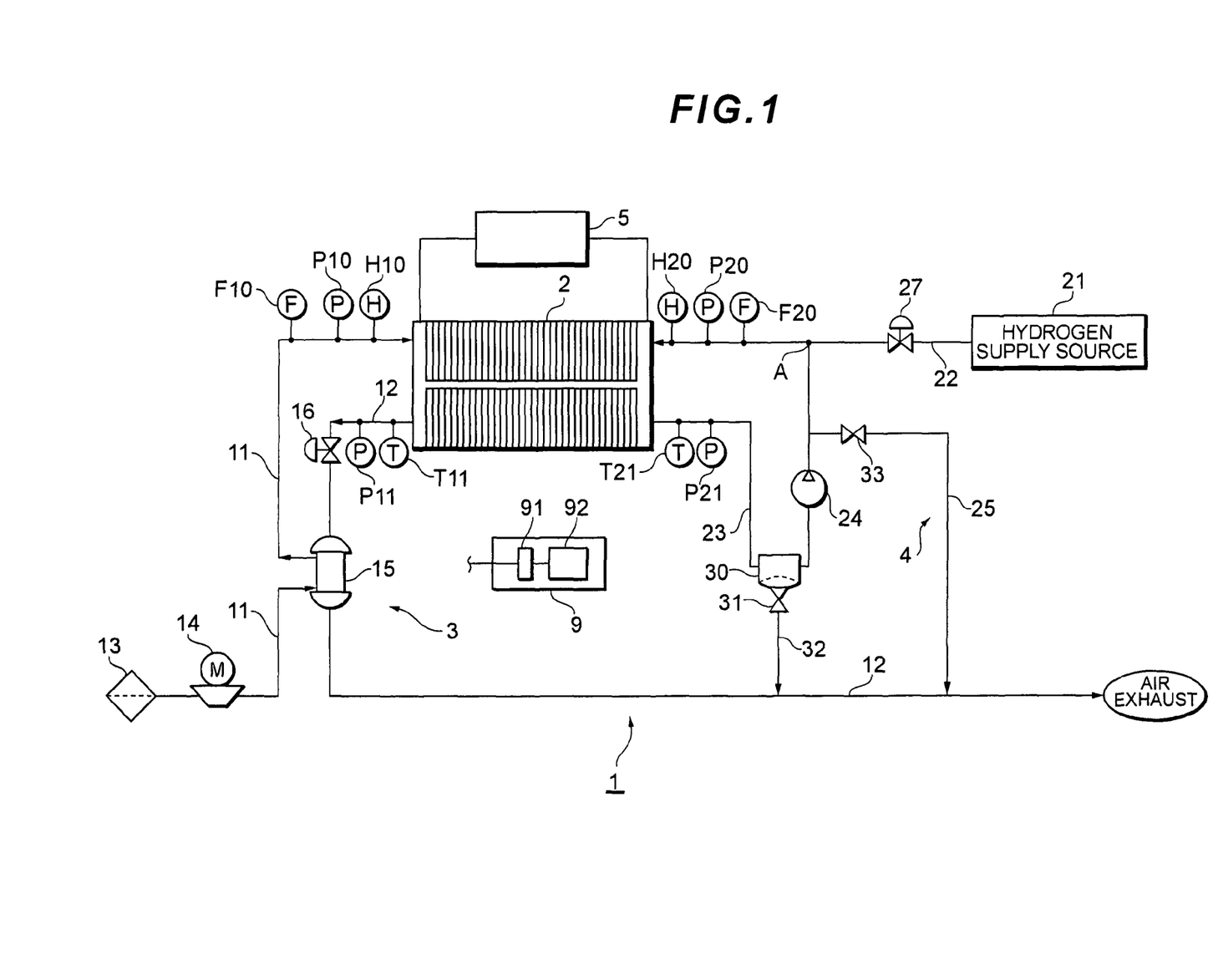
FIG. 1 is a block diagram schematically showing one embodiment of a fuel cell system according to the invention.

An air supply system 3, which has a supply pipe 11 for supplying air (inflow gas) to the fuel cell 2 and an exhaust pipe 12 for exhausting the air off-gas (exhaust gas) exhausted from the fuel cell 2 to the outside, is connected to the fuel cell system 1. A compressor 14, which takes in an atmosphere via a filter 13, and a humidifier 15, which humidities the air to be forcibly fed by the compressor 14, are disposed in the supply pipe 11. Further, a flowmeter F10, a pressure gauge P10, and a hygrometer H10 are provided in the portions of the supply pipe 11 between the fuel cell 2 and the humidifier 15.

Further, the humidifier 15 is provided so as to be arranged also on the exhaust pipe 12, thereby performing water exchange between the air to be forcibly fed and the air off-gas. The air after the water exchange is delivered to the fuel cell 2 via the supply pipe 11, and is provided for power generation in the fuel cell 2. A back pressure regulating valve 16 that regulates the pressure of the air in the fuel cell 2 is installed in the portion of the exhaust pipe 12 between the humidifier 15 and the fuel cell 2. After the air off-gas that flows through the exhaust pipe 12 is provided for water exchange in the humidifier 15 through the back pressure regulating valve 16, it is eventually exhausted into the atmosphere outside the system. Moreover, a pressure gauge P11 and a thermometer T11 are provided in the portions of the exhaust pipe 12 between the fuel cell 2 and the back pressure regulating valve 16.

Further, a hydrogen gas supply system 4 is connected to the fuel cell system 1. This hydrogen gas supply system has a high-pressure tank 21 serving as a hydrogen supply source that stores high-pressure hydrogen gas (inflow gas), a supply pipe 22 that supplies hydrogen gas of the high-pressure tank 21 to the fuel cell 2, a circulation pipe 23 for returning the hydrogen off-gas (unreacted hydrogen gas; exhaust gas) exhausted from the fuel cell 2 to the supply pipe 22, a hydrogen pump 24 that causes the hydrogen off-gas of the circulation pipe 23 to flow back to the supply pipe 22, and an exhaust pipe 25 that is branch-connected to the circulation pipe 23 and has a downstream end connected to the exhaust pipe 12 of the air supply system 3.

A regulator 27 that regulates a pressure of a new hydrogen gas from the high-pressure tank 21 is inserted on the upstream side of the supply pipe 22, and the circulation pipe 23 is connected to a junction A on the downstream side of the regulator 27. A mixed gas consisting of the new hydrogen gas and hydrogen off-gas that are joined together at the junction A is supplied to the fuel cell 2. Further, a flowmeter F20, a pressure gauge P20, and a hygrometer H20 are provided in the portions of the supply pipe 22 between the fuel cell 2 and the junction A.

A gas-liquid separator 30 that separates water from the hydrogen off-gas that flows through the circulation pipe 23 is inserted on the upstream side of the hydrogen pump 24 of the circulation pipe 23. The fluid that flows through the circulation pipe 23 contains the hydrogen off-gas exhausted from the fuel cell 2 and the generated water generated by an electro-chemical reaction in the fuel cell 2. In the gas-liquid separator 30, the water that is the generated water is separated from the hydrogen off-gas. While the hydrogen off-gas separated by the gas-liquid separator 30 arrives at the junction A by the hydrogen pump 24, the water separated by the gas-liquid separator 30 is exhausted from a fluid pipe 32 to the exhaust pipe 12 of the air supply system 3 via a drain valve 31.

The fluid pipe 32 has an upstream end connected to the drain valve 31 of the gas-liquid separator 30 and has a downstream end connected to the exhaust pipe 12 of the air supply system 3, and functions as a pipe that causes the water separated by the gas-liquid separator 30 to flow into the exhaust pipe 12. Moreover, a pressure gauge P21 and a thermometer T21 are provided in the portions of the circulation pipe 23 between the fuel cell 2 and the gas-liquid separator 30.

In the exhaust pipe 25, a purge valve 33 that functions as a shut valve that opens and closes the exhaust pipe 25 is provided. As the purge valve 33 is suitably opened during operation of the fuel cell system 1, the impurities in the hydrogen off-gas are exhausted along with the hydrogen off-gas to the exhaust pipe 12 of the oxygen system through the exhaust pipe 25. By providing the exhaust pipe 25, the concentration of the impurities in the hydrogen off-gas drops, and the concentration of the hydrogen in the hydrogen off-gas to be circularly supplied can be increased. The fluid that flows through the exhaust pipe 25 contains water besides this kind of impurities, though the gas-liquid separator 30 is provided. That is, the exhaust pipe 25 functions as a fluid pipe that causes the fluid containing the water that flows through the exhaust pipe 25 to flow into the exhaust pipe 12 of the air supply system 3.

Further, a output system 5 having a DC-DC converter and a power accumulator (both of them are not shown) is connected to the fuel cell 2 via a service plug (not shown). Moreover, the fuel cell system 1 has an arithmetic processing and memory unit 91 having a CPU or MPU, and a memory, and an input/output interface 92, and it has a control unit 9 (wet condition determination unit) connected to the air supply system 3, the hydrogen gas supply system 4, and the output system 5 via the input/output interface 92. In addition, in the arithmetic processing and memory unit 91, various kinds of operations are performed as described later, and the calculation results of the operations are sequentially stored in the memory.

Further, the above-mentioned flowmeters F10 and F20, pressure gauges P10, P11, P20, and P21, hygrometers H10 and H20, and thermometer T11 and T21 are connected to the control unit 9 via the input/output interface 92.

In the fuel cell system 1 configured as such, if air and hydrogen gas begin to be supplied to the fuel cell 2 and the fuel cell 2 is put into operation, the flow rate f (air-in), pressure p (air-in), and humidity h (air-in) of the air that flows into the fuel cell 2 are actually measured by the flowmeter F10, pressure gauge P10, and hygrometer H10 that are provided in the air supply pipe 11. Further, the pressure p (air-out) and temperature t (air-out) of the air exhausted from the fuel cell 2 are actually measured by the pressure gauge P11 and thermometer T11 that are provided in the air exhaust pipe 12.

Similarly, the flow rate f (hyd-in), pressure p (hyd-in), and humidity h (hyd-in) of the hydrogen gas that flows into the fuel cell 2 are actually measured by the flowmeter F20, pressure gauge P20, and hygrometer H20 that are provided in the hydrogen gas supply pipe 22. Further, the pressure p (hyd-out) and temperature t (hyd-out) of the hydrogen gas exhausted from the fuel cell 2 are actually measured by the pressure gauge P21 and thermometer T21 that are provided in the hydrogen gas circulation pipe 23.

Actual measurement signals of these physical amounts with respect to air and hydrogen gas are output to the control unit 9 continuously or intermittently at predetermined time intervals. Further, in the output system 5, the generated current I obtained by power generation of the fuel cell 2 is measured, and the actual measurement signal thereof is output to the control unit 9.

The control unit 9 performs various kinds of operations on the basis of the actual measurement signals. That is, the volume (amount) of air that flows into the fuel cell 2 per unit time is obtained from the inflow rate f (air-in) and inflow pressure p (air-in) of air, and the amount W (air-in) of water carried into (flowing into) the fuel cell 2 per unit time by the air is calculated from the volume of air and the humidity h (air-in). Further, the volume (amount) of the hydrogen gas that flows into the fuel cell 2 per unit time is obtained from the inflow rate f (hyd-in) and inflow pressure p (hyd-in) of hydrogen gas, and the amount W (hyd-in) of water carried into (flowing into) the fuel cell 2 per unit time by the hydrogen gas is calculated from the volume of the hydrogen gas and the humidity h (air-in).

Moreover, since the generated current I correlates with the amount of oxygen gas and the amount of hydrogen gas that are contained in the air consumed per unit time inside the fuel cell 2, the air flow rate and hydrogen gas flow rate (both are consumed flow rates) that are consumed inside the fuel cell 2 are calculated from the generated current I. Also, the difference between each of those consumed flow rates, and the inflow rate f (air-in) of air or the inflow rate f (hyd-in) of hydrogen gas to the fuel cell 2 is calculated as the exhaust flow rate f (air-out) of air or the exhaust flow rate f (hyd-out) of hydrogen gas from the fuel cell 2.

Further, the volume (amount) of air exhausted per unit time from the fuel cell 2 is obtained from the exhaust flow rate f (air-out) of air obtained as such and the actually measured exhaust pressure p (air-out). Then, from the volume of air and the saturated water vapor pressure (the saturated vapor amount) at temperature t (air-out), the amount Wv (air-out) of water carried out (exhausted) per unit time as a gas component by the air from inside the fuel cell 2 is calculated.

Similarly, the volume (amount) of air exhausted per unit time from the fuel cell 2 is obtained from the exhaust flow rate f (hyd-out) of the hydrogen gas obtained as described above and the actually measured exhaust pressure p (hyd-out). Then, from the volume of air and the saturated water vapor pressure (the saturated vapor amount) at temperature t (hyd-out), the amount Wv (hyd-out) of water carried out (exhausted) per unit time as a gas component by the hydrogen air from inside the fuel cell 2 is calculated.

Furthermore, since the generated current I correlates with the amount of oxygen gas and the amount of hydrogen gas that are contained in the air consumed per unit time inside the fuel cell 2 as mentioned above, the amount Wg of water generated in the fuel cell 2 is stoichiometrically calculated from the generated current I.

Then, the amounts W (air-in), W (hyd-in), and Wg that are calculated in this way are added together, and thereby the increased amount of water per unit time in the fuel cell 2 is calculated. Further, the amounts Wv (air-out) and Wv (hyd-out) are added together, and thereby the reduced amount (here, the amount of water exhausted as a gas component) of water per unit time in the fuel cell 2 is calculated. Then, if necessary, whether the water balance in the fuel cell 2 is positive or negative is determined by subtracting the reduced amount from the increased amount of water obtained as described above.

If the water balance is negative (minus), this shows that the amount of water exhausted as a gas component from the fuel cell 2 is more than the total amount of water that has flowed into the fuel cell 2 and the water generated inside the fuel cell. Thus, generally the air and hydrogen gas inside the fuel cell 2 are not supersaturated, and therefore the possibility that the water is made into droplets by condensation and exists as a liquid component is low.

On the contrary, if the water balance is positive (plus), the air and/or hydrogen gas inside the fuel cell 2 is supersaturated, and therefore the possibility that the water is made into droplets by condensation and exists as a liquid component is high. In this case, the water that exists as a liquid component as described above can be exhausted to the outside of the fuel cell 2 by the air and hydrogen gas that are exhausted from the fuel cell 2.

Thus, if the water balance is positive (plus), the water amount W1 (air-out) exhausted as a liquid component by the air from the fuel cell 2 and the water amount W1 (hyd-out) exhausted as a liquid component by hydrogen gas, or the total amount thereof are calculated on the basis of the exhaust flow rate f (air-out) of the air to be exhausted and the exhaust flow rate f (hyd-out) of the hydrogen gas to be exhausted, which are calculated as described above, or the generated current I of the fuel cell 2.

In this case, specifically, prior to the operation of the fuel cell system 1, first, the exhaust flow rate f (air-out) of air and the exhaust flow rate f (hyd-out) of hydrogen gas, or the generated current I of the fuel cell 2 are changed variously, then the amounts of water exhausted as a liquid component from the fuel cell 2 are measured, and the relationship therebetween is obtained in advance. Then, by storing the obtained relationship in the control unit 9 as, for example, table data or formula data, and by applying to the stored data the exhaust flow rate f (air-out) of air and the exhaust flow rate f (hyd-out) of hydrogen gas, which are calculated on the basis of actual measurement values during the actual operation of the fuel cell system 1, or the generated current I that is actually measured, the water amount W1 (air-out) and the water amount W1 (hyd-out) or the total amount thereof can be calculated.

Figure 2:
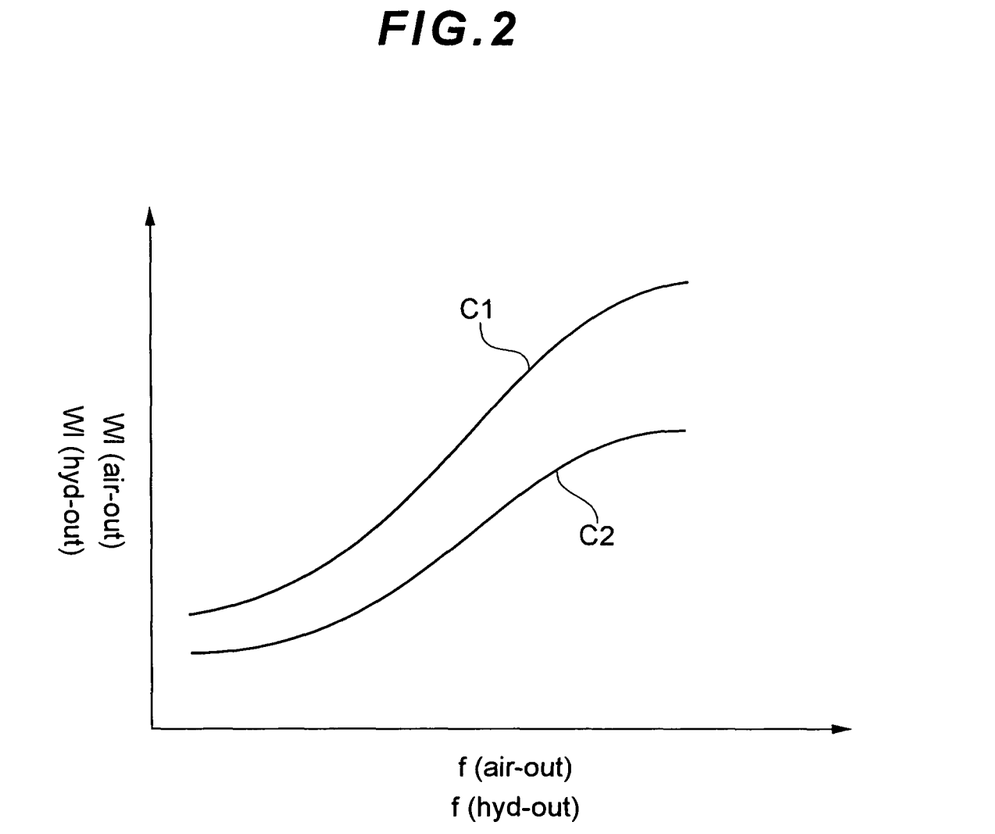
FIG. 2 is a graph showing the relationship between the exhaust flow rate of air from a fuel cell and the exhaust flow rate of hydrogen gas from the fuel cell, and the amount of water exhausted as a liquid component.
Figure 3:
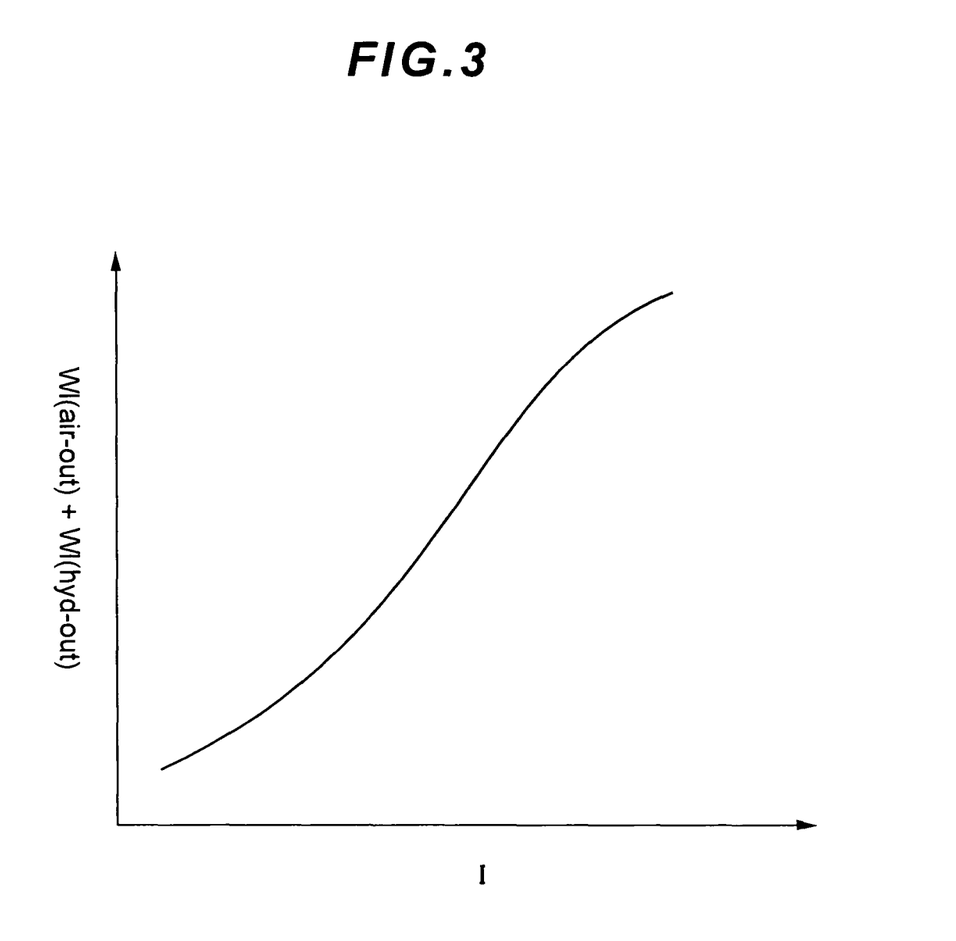
FIG. 3 is a graph showing the relationship between the generated current of the fuel cell and the total amount of water exhausted as a liquid component.

Here, FIG. 2 is a graph showing the relationship between the exhaust flow rate f (air-out) of air and the exhaust flow rate f (hyd-out) of hydrogen gas (the unit thereof is, for example, L/min) from the fuel cell 2, and the water amounts W1 (air-out) and W1 (hyd-out) (the unit thereof is, for example, g/min) exhausted as a liquid component by each gas. In the drawing, curved lines C1 and C2 represent the relationships in air and hydrogen gas, respectively. Further, FIG. 3 is a graph showing the relationship between the generated current I of the fuel cell 2 and the total amount (that is, W1 (air-out)+ W1 (hyd-out)) of water exhausted as a liquid component.

In the control unit 9, the amounts W1 (air-out) and W1 (hyd-out) of water exhausted as a liquid component or the total amount thereof, which are calculated in this way, are added to the above-mentioned reduced amount of water in the fuel cell 2, and further the water balance is determined. On the basis of the result, the wet condition inside the fuel cell 2 is determined.

According to such a fuel cell system 1, as the amount of water exhausted from the fuel cell 2, not only the amounts Wv (air-out) and Wv (hyd-out) of water exhausted as a gas component but the amounts W1 (air-out) and W1 (hyd-out) of water exhausted as a liquid component are considered. Thus, the water balance inside the fuel cell 2 can be grasped more accurately. Therefore, the wet condition inside the fuel cell 2

(the humidity of a gas phase and the humidity coefficient of a solid polymer electrolyte layer) can be determined more accurately.

Further, if the amount of the water exhausted as a liquid component as in a conventional way is not taken into consideration, there is a possibility that the amount of water inside the fuel cell may be excessively determined and evaluated. In contrast, according to the fuel cell system 1 of the invention, the water amount inside the fuel cell 2 can be properly determined and evaluated. Therefore, it is possible to suppress a situation that the humidity coefficient of a solid polymer electrolyte layer may drop disadvantageously due to excessive carrying-out of the water by exhaust of a liquid component and thereby causing dryout.

Moreover, the possibility that the water of superfluous liquid may stagnate inside the fuel cell 2 can be predicted on the basis of determination result of the water balance inside the fuel cell 2. If such a situation is predicted, it is also predicted that flooding occurs in a flow passage for the air or hydrogen gas in the fuel cell 2 by dew condensation. Thus, the flow rate or flow velocity of air and/or hydrogen gas that flows into the fuel cell 2 can be increased, thereby forcibly exhausting the superfluous water inside the fuel cell 2. Accordingly, it is possible to surely prevent occurrence of flooding, thereby enhancing generation efficiency or startability.

Further, when the internal temperature (stack temperature) of the fuel cell 2 or the temperature of the air and/or hydrogen gas to be exhausted is below a predetermined temperature, the control unit 9 may calculate the amount of water exhausted as a liquid component to perform the above-mentioned determination of water balance and wet condition.

According to the present inventor's knowledge, when the stack temperature of a certain fuel cell 2 was 80° C., the ratio (based on mass) of the water that exists as droplets in the total water that exists in the air or hydrogen gas to be exhausted was about 5%. On the other hand, when the stack temperature of the fuel cell 2 was 20° C., the ratio (based on mass) of the water that exists as droplets in the total water that exists in the air or hydrogen gas to be exhausted was about 95%.

As described above, since the amount of water contained as a liquid component when the temperature of the air or hydrogen gas to be exhausted is low is larger as compared with the case where temperature is higher, the amount of water as a liquid component carried out to the outside of the fuel cell 2 also tends to increase. In that case, the influence on the water balance of the fuel cell 2 becomes relatively large. Therefore, if the above-mentioned amounts W1 (air-out) and W1 (hyd-out) of water exhausted as a liquid component are calculated when the temperature of the fuel cell 2, the temperature t of the air (air-out) to be exhausted, or the temperature t of the hydrogen gas (hyd-out) to be exhausted is below a predetermined temperature, the water balance of the fuel cell 2 at such a low temperature and the wet condition in the fuel cell 2 can be determined more accurately. Thus, the operation performance of the fuel cell system 1 can be further improved.

Moreover, the control unit 9 can regulate and control (optimize) the inflow rate f (air-in) of air and the inflow rate f (hyd-in) of hydrogen gas on the basis of the water balance in the fuel cell 2 and the wet condition therein that are determined as above so that the generation reaction in the fuel cell 2 can be maintained efficiently.

Further, by extracting the numerical data of the inflow rate f (air-in) of air and the inflow rate f (hyd-in) of hydrogen gas, which are optimized in this way, and the generation amount at the time (output power or generated current I), it is possible to obtain a data table (a database, a control map) in which the generation amount in the fuel cell 2 is associated with the supply flow rate of air and the supply flow rate of hydrogen gas necessary and optimal to obtain the generation amount.

Also, once such a data table is set, it is possible to simply determine the optimal amount of supply of air and hydrogen gas to obtain a desired generation amount with the fuel cell 2 on the basis of the data table. Thus, the efficient operation control of the fuel cell 2 can be realized.

Further, if such a data table is set in advance from the operation data of the fuel cell 2 and is stored in a device, such as an arithmetic processing and memory unit 91, the efficient operation control of the fuel cell 2 by the control unit 9 can be made on the basis of the data table even if the above-mentioned determination of water balance and wet condition is not performed at every operation of the fuel cell 2. Moreover, if such a data table is used, efficient and simple operation control of other fuel cells of the same kind or the same type as the fuel cell 2 is also allowed.

In addition, the invention is not limited to the above-described embodiment, and can be modified in various forms without departing from the spirit and scope thereof. For example, a flowmeter and a hygrometer may be provided in the exhaust pipes 12 and 23, and the exhaust flow rate of air and hydrogen gas may be calculated based on the actual measurement values by the flowmeter and hygrometer and the actual measurement value of pressure. Further, instead of the hygrometers H10 and H20, a dew-point meter may be provided to measure the amount of the water in air and hydrogen gas. Moreover, it is preferable to determine the water balance about which the amount of the water exhausted as a liquid component is considered, in both the air supply system 3 and the hydrogen gas supply system 4. However, such determination may be executed only in either the air supply system 3 or the hydrogen gas supply system 4. In that case, it is preferable to execute such determination in the air supply system 3 in which flooding by generated water is relatively apt to occur.

Further, the humidifier 15 may not be provided. In this case, the fuel cell system 1 becomes a system that does not humidify air. Then, the amount of water contained in the air that flows into the system decreases as compared with the case where air is humidified. In this case, if the amount W (air-in) of water carried by the air into the fuel cell 2 per unit time is a negligible amount as compared with, for example, the amount Wg of water generated in the fuel cell 2, the water balance may be calculated, considering the water amount W (air-in) to be substantially zero. Similarly, if the amount W (hyd-in) of water carried by the hydrogen gas into the fuel cell 2 per unit time is a negligible amount as compared with, for example, the amount Wg of water generated in the fuel cell 2, naturally the water balance can be calculated, considering the water amount W (hyd-in) to be substantially zero.

Thus, as for calculation of the water balance in the wet condition determination unit in the invention, if the amount of water other than water exhausted as a liquid component, among the amount of inflow water, the amount of exhausted water (the amount of water exhausted as a gas component and the amount of water exhausted as a liquid component), and the amount of generated water, is such that it does not have an influence on the water balance, the calculation may be simplified by considering the above water amount to be substantially zero (by calculating the amount as zero). A unit performing such calculation of the water balance is also included in the "wet condition determination unit" in the invention.

In addition, the fuel cell system 1 of the invention can also be incorporated into, for example, a cogeneration system with the fuel cell 2 in stationary applications, and the cogeneration system can also be introduced no only for business but for household, as well as loaded onto movable bodies, such as vehicles and portable devices.

INDUSTRIAL APPLICABILITY

According to the fuel cell system according to the invention, the amount of water inside a fuel cell can be grasped more accurately, and thereby, the wet condition inside the fuel cell can be determined more accurately and precisely. Thus, the fuel cell system can be widely utilized even in facilities, such as cogeneration systems for business and household using fuel cells in stationary applications, as well as loaded onto movable bodies, such as vehicles and portable devices.

Further, the generation control device of the invention can simply perform the efficient operation control of a fuel cell by using a data table in which the generation amount obtained as the operation results of the fuel cell system of the invention are associated with the optimal amounts of supply of fuel gas and oxidant gas. Thus, similarly to the above, the fuel cell system can be widely utilized even in facilities, such as cogeneration systems for business and household using fuel cells in stationary applications, as well as loaded onto movable bodies, such as vehicles and portable devices.

The invention claimed is:

1. A fuel cell system comprising a wet condition determination unit that determines water balance in a fuel cell and determines the wet condition of the fuel cell, from an inflow water amount and an exhausted water amount to and from the fuel cell and a generated water amount therein,
wherein the wet condition determination unit is programmed to calculate the inflow water amount, the amount of water exhausted as a gas component from the fuel cell and the amount of water exhausted as a liquid component from the fuel cell, both of which are each provided as the exhausted water amount, and the generated water amount, on the basis of the physical amount of inflow gas to the fuel cell, the physical amount of exhaust gas from the fuel cell, and the state quantity of the fuel cell,
wherein the wet-condition determination unit is further programmed to calculate the amount of water exhausted as a gas component by using a flow rate, pressure and humidity or a dew-point temperature or temperature as the physical amount of the exhaust gas, and
wherein the wet condition determination unit is further programmed to calculate the amount of water exhausted as a liquid component during actual operation of the fuel cell system on the basis of the relationship of the amount of water exhausted as a liquid component from the fuel cell with respect to the flow rate of the exhaust gas obtained in advance prior to the actual operation of the fuel cell system, the flow rate of the exhaust gas obtained during the actual operation of the fuel cell, and the temperature of the fuel cell or the exhaust gas.

2. The fuel cell system according to claim 1,
wherein the wet condition determination unit calculates the inflow water amount by using a flow rate, pressure, and humidity or dew-point temperature as the physical amount of the inflow gas, calculates the amount of water exhausted as a gas component by using a flow rate, pressure, and humidity or a dew-point temperature or temperature as the physical amount of the exhaust gas, and calculates the generated water amount from a generated current as the state quantity of the fuel cell.

3. The fuel cell system according to claim 1,
wherein the wet condition determination unit calculates the consumed flow rate of the inflow gas consumed inside the fuel cell from the generated current and calculates the flow rate of the exhaust gas from the consumed flow rate and the flow rate of the inflow gas.

4. The fuel cell system according to claim 1,
wherein the wet condition determination unit calculates the amount of water exhausted as a liquid component when the temperature of the fuel cell or exhaust gas is below a predetermined temperature.

5. The fuel cell system according to claim 1,
wherein the inflow gas and the exhaust gas are fuel gas and/or oxidant gas.

6. A generation control device comprising:
a memory unit that stores a data table in which a current generation amount in the fuel cell, which is set on the basis of the determination result of the water balance of the fuel cell and the determination result of the wet condition of the fuel cell in the fuel cell system according to claim 1, is associated with supply flow rates of the fuel gas and the oxidant gas necessary to obtain the current generation amount; and
a control unit that performs operation control of supplying the fuel gas and the oxidant gas to the fuel cell or fuel cells other than the fuel cell so that a desired current generation amount may be obtained in the fuel cell or other fuel cells on the basis of the data table.

7. The fuel cell system according to claim 2,
wherein the wet condition determination unit calculates the amount of water exhausted as a liquid component when the temperature of the fuel cell or exhaust gas is below a predetermined temperature.

8. The fuel cell system according to claim 3,
wherein the wet condition determination unit calculates the amount of water exhausted as a liquid component when the temperature of the fuel cell or exhaust gas is below a predetermined temperature.

9. The fuel cell system according to claim 2,
wherein the inflow gas and the exhaust gas are fuel gas and/or oxidant gas.

10. The fuel cell system according to claim 3,
wherein the inflow gas and the exhaust gas are fuel gas and/or oxidant gas.

11. The fuel cell system according to claim 4,
wherein the inflow gas and the exhaust gas are fuel gas and/or oxidant gas.

12. A generation control device comprising:
a memory unit that stores a data table in which a current generation amount in the fuel cell, which is set on the basis of the determination result of the water balance of the fuel cell and the determination result of the wet condition of the fuel cell in the fuel cell system according to claim 2, is associated with supply flow rates of the fuel gas and the oxidant gas necessary to obtain the current generation amount; and
a control unit that performs operation control of supplying the fuel gas and the oxidant gas to the fuel cell or fuel cells other than the fuel cell so that a desired current generation amount may be obtained in the fuel cell or other fuel cells on the basis of the data table.

13. A generation control device comprising:
a memory unit that stores a data table in which a current generation amount in the fuel cell, which is set on the basis of the determination result of the water balance of the fuel cell and the determination result of the wet condition of the fuel cell in the fuel cell system according to claim 3, is associated with supply flow rates of the fuel gas and the oxidant gas necessary to obtain the current generation amount; and a control unit that performs operation control of supplying the fuel gas and the oxidant gas to the fuel cell or fuel cells other than the fuel cell so that a desired current generation amount may be obtained in the fuel cell or other fuel cells on the basis of the data table.

14. A generation control device comprising:

a memory unit that stores a data table in which a current generation amount in the fuel cell, which is set on the basis of the determination result of the water balance of the fuel cell and the determination result of the wet condition of the fuel cell in the fuel cell system according to claim 4, is associated with supply flow rates of the fuel gas and the oxidant gas necessary to obtain the current generation amount; and a control unit that performs operation control of supplying the fuel gas and the oxidant gas to the fuel cell or fuel cells other than the fuel cell so that a desired current generation amount may be obtained in the fuel cell or other fuel cells on the basis of the data table.

15. A generation control device comprising:

a memory unit that stores a data table in which a current generation amount in the fuel cell, which is set on the basis of the determination result of the water balance of the fuel cell and the determination result of the wet condition of the fuel cell in the fuel cell system according to claim 7, is associated with supply flow rates of the fuel gas and the oxidant gas necessary to obtain the current generation amount; and a control unit that performs operation control of supplying the fuel gas and the oxidant gas to the fuel cell or fuel cells other than the fuel cell so that a desired current generation amount may be obtained in the fuel cell or other fuel cells on the basis of the data table.

\* \* \* \* \*

UNITED STATES PATENT AND TRADEMARK OFFICE
CERTIFICATE OF CORRECTION

PATENT NO.       : 8,431,277 B2
APPLICATION NO.  : 11/989582
DATED            : April 30, 2013
INVENTOR(S)      : Nobuyuki Orihashi It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1304 days.

Signed and Sealed this
Eighth Day of September, 2015

Michelle K. Lee
*Director of the United States Patent and Trademark Office*